US012344724B2

(12) United States Patent
O'Neil et al.

(10) Patent No.: US 12,344,724 B2
(45) Date of Patent: Jul. 1, 2025

(54) SECONDARY BATTERY PACK WITH IMPROVED THERMAL MANAGEMENT (71) Applicant: Elkem Silicones USA Corp., East Brunswick, NJ (US)

(72) Inventors: Virginia O'Neil, York, SC (US); Jessica Hanley, Allentown, PA (US); Matthew Kihara, Lake Wylie, SC (US); Leeanne Brown, Chester, SC (US); Michael John Watson, Fort Mill, SC (US); Matthew Paul Timmons, Charlotte, NC (US)

(73) Assignee: Elkem Silicones USA Corp., East Brunswick, NJ (US)

( * ) Notice: Subject to any disclaimer, the term of this patent is extended or adjusted under 35 U.S.C. 154(b) by 0 days.

(21) Appl. No.: 18/456,067

(22) Filed: Aug. 25, 2023

(65) Prior Publication Data
US 2023/0399483 A1 Dec. 14, 2023

Related U.S. Application Data (63) Continuation of application No. 18/178,099, filed on Mar. 3, 2023, now Pat. No. 11,905,385, which is a
(Continued)

(51) Int. Cl.
*H01M 10/613* (2014.01)
*C08G 77/20* (2006.01)
(Continued)

(52) U.S. Cl.
CPC ................ *C08J 9/32* (2013.01); *C08G 77/20* (2013.01); *C08G 77/38* (2013.01); *C08K 3/40* (2013.01);
(Continued)

(58) Field of Classification Search
CPC ............. H01M 10/613; H01M 10/625; H01M 10/643; H01M 10/6551; H01M 10/6557;
(Continued)

(56) References Cited

U.S. PATENT DOCUMENTS 3,159,601 A 12/1964 Ashby
3,159,602 A 12/1964 Hamilton et al.
(Continued)

FOREIGN PATENT DOCUMENTS

CN 101367952 A 2/2009
CN 102264800 A 11/2011
(Continued)

OTHER PUBLICATIONS

International Search Report issued Apr. 16, 2018 in International Application No. PCT/US2018/017227.

*Primary Examiner* — Jane J Rhee
(74) *Attorney, Agent, or Firm* — McBee Moore & Vanik IP, LLC (57) ABSTRACT The present invention relates to a novel secondary battery pack with improved thermal management useful for an all-electric vehicle (EV), a plug-in hybrid vehicle (PHEV), a hybrid vehicle (HEV), or battery packs used for other vehicles batteries, and more particularly, to the use of a specific material for thermally insulating a secondary battery pack and further minimizing the propagation of thermal runaway within a battery pack.

26 Claims, 2 Drawing Sheets

Related U.S. Application Data continuation of application No. 17/534,730, filed on Nov. 24, 2021, now Pat. No. 11,780,983, which is a continuation of application No. 16/673,628, filed on Nov. 4, 2019, now Pat. No. 11,261,309, which is a continuation of application No. 15/891,037, filed on Feb. 7, 2018, now Pat. No. 10,501,597.

(60) Provisional application No. 62/456,502, filed on Feb. 8, 2017.

(51) Int. Cl.
| | |
|---|---|
| *C08G 77/38* | (2006.01) |
| *C08J 9/32* | (2006.01) |
| *C08K 3/40* | (2006.01) |
| *C08K 7/28* | (2006.01) |
| *H01M 10/052* | (2010.01) |
| *H01M 10/0525* | (2010.01) |
| *H01M 10/625* | (2014.01) |
| *H01M 10/643* | (2014.01) |
| *H01M 10/6551* | (2014.01) |
| *H01M 10/6557* | (2014.01) |
| *H01M 10/658* | (2014.01) |
| *H01M 50/24* | (2021.01) |
| *H01M 50/249* | (2021.01) |
| *H01M 50/293* | (2021.01) |
| *H01M 50/204* | (2021.01) |

(52) U.S. Cl.
CPC .............. *C08K 7/28* (2013.01); *H01M 10/052* (2013.01); *H01M 10/0525* (2013.01); *H01M 10/613* (2015.04); *H01M 10/625* (2015.04); *H01M 10/643* (2015.04); *H01M 10/6551* (2015.04); *H01M 10/6557* (2015.04); *H01M 10/658* (2015.04); *H01M 50/24* (2021.01); *H01M 50/249* (2021.01); *H01M 50/293* (2021.01); *C08G 2330/50* (2013.01); *C08J 2383/04* (2013.01); *C08K 2201/002* (2013.01); *H01M 50/204* (2021.01); *H01M 2220/20* (2013.01); *Y02E 60/10* (2013.01); *Y02T 10/70* (2013.01)

(58) Field of Classification Search
CPC .. H01M 10/658; H01M 50/249; H01M 50/24; H01M 50/293; H01M 50/052; H01M 50/0525; H01M 2220/20; C08J 9/32; C08J 2383/04; C08G 77/20; C08G 77/38; C08G 2330/50; C08K 7/28; C08K 2201/002
See application file for complete search history.

(56) References Cited

U.S. PATENT DOCUMENTS

| | | | |
|---|---|---|---|
| 3,188,299 A | 6/1965 | Chalk | |
| 3,220,972 A | 11/1965 | Lamoreaux | |
| 3,377,432 A | 4/1968 | Abbott | |
| 3,419,593 A | 12/1968 | Willing | |
| 3,445,420 A | 5/1969 | Kookootsedes et al. | |
| 3,498,945 A | 3/1970 | Lefort et al. | |
| 3,715,334 A | 2/1973 | Karstedt | |
| 3,775,452 A | 11/1973 | Karstedt | |
| 3,814,730 A | 6/1974 | Karstedt | |
| 3,892,707 A | 7/1975 | Itoh et al. | |
| 3,923,705 A | 12/1975 | Smith | |
| 3,933,712 A | 1/1976 | Vanaglash, Jr. | |
| 3,989,667 A | 11/1976 | Lee et al. | |
| 4,024,091 A | 5/1977 | Lee et al. | |
| 4,025,485 A | 5/1977 | Kodama et al. | |
| 4,026,842 A | 5/1977 | Lee et al. | |
| 4,053,691 A | 10/1977 | Ciliberti, Jr. | |
| 4,082,726 A | 4/1978 | Mine et al. | |
| 4,182,824 A | 1/1980 | Suzuki et al. | |
| 4,256,870 A | 3/1981 | Eckberg | |
| 4,257,936 A | 3/1981 | Matsumoto et al. | |
| 4,269,757 A | 5/1981 | Mine et al. | |
| 4,339,563 A | 7/1982 | Takago et al. | |
| 4,347,346 A | 8/1982 | Eckberg | |
| 4,364,809 A | 12/1982 | Sato et al. | |
| 4,418,127 A | 11/1983 | Shambaugh et al. | |
| 4,582,762 A | 4/1986 | Onohara et al. | |
| 4,594,134 A | 6/1986 | Hanada et al. | |
| 4,686,124 A | 8/1987 | Onohara et al. | |
| 4,736,049 A | 4/1988 | Suzuki et al. | |
| 4,742,103 A | 5/1988 | Morita et al. | |
| 4,766,192 A | 8/1988 | Gvozdic | |
| 4,842,943 A | 6/1989 | Kobayashi et al. | |
| 4,849,491 A | 7/1989 | Ogawa et al. | |
| 4,870,149 A | 9/1989 | Hara et al. | |
| 4,888,374 A | 12/1989 | Takahashi et al. | |
| 4,970,252 A | 11/1990 | Sakuta et al. | |
| 4,987,169 A | 1/1991 | Kuwata et al. | |
| 5,008,307 A | 4/1991 | Inomata | |
| 5,009,957 A | 4/1991 | Lee et al. | |
| 5,061,481 A | 10/1991 | Suzuki et al. | |
| 5,092,922 A | 3/1992 | Kuwata et al. | |
| 5,095,085 A | 3/1992 | Hara et al. | |
| 5,100,990 A | 3/1992 | Irifune et al. | |
| 5,143,803 A | 9/1992 | Andres et al. | |
| 5,162,397 A | 11/1992 | Descamps et al. | |
| 5,206,328 A | 4/1993 | Okamura et al. | |
| 5,216,104 A | 6/1993 | Okami et al. | |
| 5,219,560 A | 6/1993 | Suzuki et al. | |
| 5,236,986 A | 8/1993 | Sakuta | |
| 5,266,321 A | 11/1993 | Shukuzaki et al. | |
| 5,384,075 A | 1/1995 | Okami | |
| 5,412,004 A | 5/1995 | Tachibana et al. | |
| 5,482,978 A * | 1/1996 | Takahashi | C08J 9/0023 521/154 |
| 5,494,750 A | 2/1996 | Fujioka et al. | |
| 5,516,838 A | 5/1996 | Fujiki et al. | |
| 5,536,803 A | 7/1996 | Fujiki et al. | |
| 5,618,631 A | 4/1997 | Meguriya et al. | |
| 5,626,982 A | 5/1997 | Kawai et al. | |
| 5,645,941 A | 7/1997 | Meguriya et al. | |
| 5,658,674 A | 8/1997 | Lorenzetti et al. | |
| 5,666,626 A | 9/1997 | Takizawa et al. | |
| 5,691,434 A | 11/1997 | Ogawa et al. | |
| 5,767,183 A | 6/1998 | Takei et al. | |
| 5,767,193 A | 6/1998 | Fujiki et al. | |
| 5,817,717 A | 10/1998 | Lievre et al. | |
| 5,820,284 A | 10/1998 | Owada et al. | |
| 5,908,592 A | 6/1999 | Kimura et al. | |
| 6,127,503 A | 10/2000 | Fujioka et al. | |
| 6,143,812 A | 11/2000 | Martin et al. | |
| 6,235,861 B1 | 5/2001 | Kishi et al. | |
| 6,284,829 B1 | 9/2001 | Dalbe et al. | |
| 6,369,184 B1 | 4/2002 | Bohin et al. | |
| 6,387,452 B1 | 5/2002 | Benayoun et al. | |
| 6,395,338 B1 | 5/2002 | Benayoun et al. | |
| 6,472,078 B1 | 10/2002 | Shudo et al. | |
| 6,511,754 B1 | 1/2003 | Bohin et al. | |
| 6,562,180 B1 | 5/2003 | Bohin et al. | |
| 6,562,737 B1 | 5/2003 | Bohin et al. | |
| 6,762,242 B1 | 7/2004 | Del Torto et al. | |
| 6,835,331 B2 * | 12/2004 | Fujiki | H05K 1/095 252/514 |
| 7,479,522 B2 | 1/2009 | Zhu | |
| 7,547,743 B2 | 6/2009 | Goto et al. | |
| 7,566,756 B2 | 7/2009 | Kashiwagi | |
| 8,367,233 B2 | 2/2013 | Hermann et al. | |
| 8,410,239 B2 | 4/2013 | Blanc et al. | |
| 8,524,842 B2 | 9/2013 | Jung et al. | |
| 9,056,953 B2 | 6/2015 | Blanc et al. | |
| 9,463,151 B2 | 10/2016 | Souda et al. | |
| 9,947,858 B2 | 4/2018 | Fujisawa et al. | |
| 10,501,597 B2 | 12/2019 | O'Neil et al. | |
| 11,160,648 B2 | 11/2021 | Ou et al. | |

(56) References Cited

U.S. PATENT DOCUMENTS

| | | |
|---|---|---|
| 11,510,862 B2 | 11/2022 | Roux et al. |
| 11,518,883 B2 | 12/2022 | Jia et al. |
| 2002/0014692 A1 | 2/2002 | Yamada et al. |
| 2002/0022009 A1 | 2/2002 | De La Poterie et al. |
| 2002/0058112 A1 | 5/2002 | Branlard et al. |
| 2002/0114891 A1 | 8/2002 | Benayoun et al. |
| 2003/0049466 A1 | 3/2003 | Yamada et al. |
| 2003/0143408 A1 | 7/2003 | Benayoun et al. |
| 2003/0149166 A1 | 8/2003 | Duffy et al. |
| 2003/0195124 A1 | 10/2003 | Yamada et al. |
| 2004/0106706 A1 | 6/2004 | Tanaka et al. |
| 2004/0236003 A1 | 11/2004 | Del Torto et al. |
| 2005/0020738 A1 | 1/2005 | Jackson et al. |
| 2005/0058842 A1 | 3/2005 | Liebmann-Vinson et al. |
| 2005/0059140 A1 | 3/2005 | Liebmann-Vinson et al. |
| 2005/0075020 A1 | 4/2005 | Benayoun et al. |
| 2005/0084691 A1 | 4/2005 | Endo et al. |
| 2005/0119406 A1 | 6/2005 | Duffy et al. |
| 2005/0123689 A1 | 6/2005 | Branlard et al. |
| 2005/0165194 A1 | 7/2005 | Benayoun et al. |
| 2005/0205829 A1 | 9/2005 | Magd et al. |
| 2005/0282453 A1 | 12/2005 | Jackson et al. |
| 2006/0046077 A1 | 3/2006 | Howe et al. |
| 2006/0057779 A1 | 3/2006 | Sutoh et al. |
| 2006/0084753 A1 | 4/2006 | Dumont et al. |
| 2006/0115656 A1 | 6/2006 | Martin et al. |
| 2006/0128881 A1 | 6/2006 | George et al. |
| 2006/0142523 A1 | 6/2006 | Pouchelon et al. |
| 2006/0157453 A1 | 7/2006 | Dumont et al. |
| 2007/0042533 A1 | 2/2007 | Endo et al. |
| 2007/0259258 A1 | 11/2007 | Buck et al. |
| 2008/0213578 A1 | 9/2008 | Endo et al. |
| 2008/0249259 A1 | 10/2008 | Kashiwagi et al. |
| 2008/0300365 A1 | 12/2008 | Ohtani et al. |
| 2009/0111931 A1 | 4/2009 | Pouchelon et al. |
| 2009/0171010 A1 | 7/2009 | Kilgour et al. |
| 2009/0171055 A1 | 7/2009 | Kilgour et al. |
| 2009/0208660 A1 | 8/2009 | Guennouni et al. |
| 2009/0214870 A1 | 8/2009 | Morita et al. |
| 2009/0264035 A1 | 10/2009 | Pouchelon et al. |
| 2009/0297719 A1 | 12/2009 | Magd et al. |
| 2009/0326103 A1 | 12/2009 | Mogi et al. |
| 2010/0003484 A1 | 1/2010 | Blanc et al. |
| 2010/0028685 A1 | 2/2010 | White et al. |
| 2010/0048743 A1 | 2/2010 | Rapson |
| 2010/0048810 A1 | 2/2010 | Jeram et al. |
| 2010/0055449 A1 | 3/2010 | Ota |
| 2010/0130673 A1 | 5/2010 | Ito et al. |
| 2010/0178517 A1 | 7/2010 | Pouchelon et al. |
| 2010/0213623 A1 | 8/2010 | Isshiki et al. |
| 2010/0266856 A1 | 10/2010 | White et al. |
| 2010/0310780 A1 | 12/2010 | Martin et al. |
| 2011/0015305 A1 | 1/2011 | Kondo |
| 2011/0018234 A1 | 1/2011 | Bordes et al. |
| 2011/0018235 A1 | 1/2011 | Dumont et al. |
| 2011/0024675 A1 | 2/2011 | Endo et al. |
| 2011/0098400 A1 | 4/2011 | Blanc-Magnard et al. |
| 2011/0183566 A1 | 7/2011 | Feder et al. |
| 2011/0245403 A1 | 10/2011 | Jeram et al. |
| 2012/0003508 A1 | 1/2012 | Narbonne et al. |
| 2012/0009412 A1 | 1/2012 | Iwai et al. |
| 2012/0052758 A1 | 3/2012 | Peschko et al. |
| 2012/0119137 A1 | 5/2012 | Tsuji et al. |
| 2012/0164406 A1 | 6/2012 | Defaux et al. |
| 2012/0184663 A1 | 7/2012 | Hamamoto et al. |
| 2012/0289111 A1 | 11/2012 | Dumont et al. |
| 2013/0087905 A1 | 4/2013 | Yamada et al. |
| 2013/0105726 A1 | 5/2013 | Tsuji et al. |
| 2013/0190470 A1 | 7/2013 | Marrot et al. |
| 2013/0266339 A1 | 10/2013 | Sugiyama et al. |
| 2013/0267628 A1 | 10/2013 | Del Torto |
| 2013/0310780 A1 | 11/2013 | Phillips |
| 2013/0310781 A1 | 11/2013 | Phillips et al. |
| 2014/0024731 A1 | 1/2014 | Blanc et al. |
| 2014/0314979 A1 | 10/2014 | Thiria et al. |
| 2014/0357827 A1 | 12/2014 | Swier |
| 2015/0001439 A1 | 1/2015 | Tsuji et al. |
| 2015/0064831 A1* | 3/2015 | Furihata ............... H01L 31/048 438/64 |
| 2015/0148273 A1 | 5/2015 | Matsumoto et al. |
| 2015/0159066 A1 | 6/2015 | Hartwell et al. |
| 2015/0315214 A1 | 11/2015 | Pouget et al. |
| 2015/0337188 A1 | 11/2015 | Sakakibara et al. |
| 2015/0357261 A1 | 12/2015 | Tsuji et al. |
| 2015/0376481 A1 | 12/2015 | Larson et al. |
| 2015/0380636 A1 | 12/2015 | Fujisawa et al. |
| 2016/0018576 A1 | 1/2016 | Yamamoto et al. |
| 2016/0068732 A1 | 3/2016 | Kitazawa |
| 2016/0096984 A1 | 4/2016 | Matsumoto |
| 2016/0120706 A1 | 5/2016 | Collinson |
| 2016/0181576 A1 | 6/2016 | Zouta et al. |
| 2017/0066886 A1 | 3/2017 | Kitazawa et al. |
| 2017/0096591 A1 | 4/2017 | Akiba et al. |
| 2017/0101570 A1 | 4/2017 | Iwata |
| 2017/0260392 A1 | 9/2017 | Kitazawa et al. |
| 2017/0283677 A1 | 10/2017 | Iwata |
| 2017/0306150 A1 | 10/2017 | Nishida et al. |
| 2017/0313924 A1 | 11/2017 | Iwata |
| 2018/0022977 A1 | 1/2018 | Tsuji |
| 2018/0094207 A1 | 4/2018 | Ichiroku |
| 2018/0179384 A1 | 6/2018 | Matsumoto et al. |
| 2018/0223069 A1 | 8/2018 | O'Neil et al. |
| 2018/0223070 A1 | 8/2018 | O'Neil et al. |
| 2018/0265641 A1 | 9/2018 | Feder et al. |
| 2019/0002694 A1 | 1/2019 | Akiba et al. |
| 2019/0085167 A1 | 3/2019 | Iwata |
| 2019/0161666 A1 | 5/2019 | Tanigawa et al. |
| 2019/0249036 A1 | 8/2019 | Pibre et al. |
| 2019/0309206 A1 | 10/2019 | Tsuji et al. |
| 2019/0359874 A1 | 11/2019 | Kitazawa |
| 2020/0022899 A1 | 1/2020 | Roux et al. |
| 2020/0032000 A1 | 1/2020 | Kitazawa |
| 2020/0138693 A1 | 5/2020 | Liu et al. |
| 2020/0270454 A1 | 8/2020 | Jia et al. |
| 2020/0347201 A1 | 11/2020 | Hirabayashi |
| 2020/0361180 A1 | 11/2020 | Zhou et al. |
| 2020/0405591 A1 | 12/2020 | Mizuno et al. |
| 2021/0284803 A1 | 9/2021 | Akiba et al. |
| 2021/0324148 A1 | 10/2021 | Tsuji et al. |
| 2021/0388207 A1 | 12/2021 | Kitazawa |
| 2022/0044983 A1 | 2/2022 | Akiba et al. |
| 2022/0049122 A1 | 2/2022 | Pibre et al. |
| 2022/0119677 A1 | 4/2022 | Zhou et al. |
| 2022/0145156 A1 | 5/2022 | Yamada |
| 2022/0213370 A1 | 7/2022 | Akiba |
| 2022/0298305 A1 | 9/2022 | Kumaresan et al. |
| 2022/0380652 A1 | 12/2022 | Maruyama et al. |
| 2022/0384899 A1 | 12/2022 | Zaffaroni et al. |
| 2023/0016906 A1 | 1/2023 | Sakamoto et al. |

FOREIGN PATENT DOCUMENTS

| | | |
|---|---|---|
| CN | 103265813 A | 8/2013 |
| CN | 103456984 A | 12/2013 |
| CN | 103655212 A | 3/2014 |
| CN | 104312531 A | 1/2015 |
| CN | 105238061 A | 1/2016 |
| CN | 205104554 U | 3/2016 |
| CN | 109401725 A | 3/2019 |
| CN | 110684358 A | 1/2020 |
| CN | 110819119 A | 2/2020 |
| CN | 110964325 A | 4/2020 |
| CN | 111138865 A | 5/2020 |
| CN | 111462940 A | 7/2020 |
| CN | 114026186 A | 2/2022 |
| DE | 202005010708 U1 | 9/2005 |
| EP | 0057459 A1 | 8/1982 |
| EP | 0188978 A1 | 7/1986 |
| EP | 0190530 A1 | 8/1986 |
| GB | 942744 A | 11/1963 |
| JP | H05251110 A | 9/1993 |
| JP | H05343041 A | 12/1993 |
| JP | 2000108687 A | 4/2000 |
| JP | 2001223034 A | 8/2001 |

(56) References Cited

FOREIGN PATENT DOCUMENTS

| | | |
|---|---|---|
| JP | 2004026875 A | 1/2004 |
| JP | 2005255863 A | 9/2005 |
| JP | 2007063389 A | 3/2007 |
| JP | 3920944 B2 | 5/2007 |
| JP | 2009301877 A | 12/2009 |
| JP | 2010062093 A | 3/2010 |
| JP | 2010155946 A | 7/2010 |
| JP | 2011081981 A | 4/2011 |
| JP | 2013089308 A | 5/2013 |
| JP | 2013114115 A | 6/2013 |
| JP | 2014086330 A | 5/2014 |
| JP | 2014216141 A | 11/2014 |
| JP | 2015089897 A | 5/2015 |
| JP | 2016505693 A | 10/2018 |
| KR | 20160111457 A | 9/2016 |
| RU | 2529883 C1 | 10/2014 |
| WO | 2018134704 A1 | 7/2018 |
| WO | 20220181134 A1 | 7/2022 |
| WO | 20220143619 A1 | 9/2022 |

* cited by examiner

SECONDARY BATTERY PACK WITH IMPROVED THERMAL MANAGEMENT

CROSS REFERENCE TO RELATED APPLICATIONS

This application is a continuation of U.S. patent application Ser. No. 18/178,099, filed Mar. 3, 2023, which is continuation of U.S. patent application Ser. No. 17/534,730, filed Nov. 24, 2021, which is a continuation of U.S. patent application Ser. No. 16/673,628, filed Nov. 4, 2019, now U.S. Pat. No. 11,261,309, issued Mar. 1, 2022, which is a continuation of U.S. patent application Ser. No. 15/891,037, filed Feb. 7, 2018, now U.S. Pat. No. 10,501,597, issued Dec. 10, 2019, which claims priority to U.S. Provisional Ser. No. 62/456,502 filed Feb. 8, 2017. The contents of each of which are incorporated herein by reference in their entirety for all purposes.

FIELD OF THE INVENTION

The present invention relates to a novel secondary battery pack, in particular those comprising lithium-ion battery cells, with improved thermal management allowing the use under extended conditions of temperature extremes. More particularly, the invention relates to the use of a specific material for thermally insulating a secondary battery pack and further minimizing the propagation of thermal excursions within a battery pack. Said secondary battery pack could be used in an all-electric vehicle (EV), a plug-in hybrid vehicle (PHEV), a hybrid vehicle (HEV), or for other vehicles batteries.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery. Examples of the secondary batteries may include nickel-cadmium batteries, nickel-metal hybrid batteries, nickel-hydrogen batteries, lithium secondary batteries, etc.

Secondary batteries, in particular lithium-ion batteries, have emerged as a key energy storage technology and are now the main technology for consumer electronics devices, industrial, transportation, and power-storage applications.

Due to their high potential and their high energy and power densities, and also their good lifetime, secondary batteries are now the preferred battery technology, in particular in the automotive industry as it is now possible to provide longer driving range and suitable acceleration for electrically propelled vehicles such as Hybrid Electric Vehicles (HEVs), Battery Electric Vehicles (BEVs) and Plug-In Hybrid Electric Vehicles (PHEVs). In current automotive industry, different sizes and shapes of lithium-ion battery cells are being manufactured and are subsequently assembled into packs of different configurations. An automotive secondary battery pack typically consists of a large number of battery cells, sometimes several hundreds, even thousands, to meet desired power and capacity needs.

This switch in drive train technology is not, however, without its technological hurdles as the use of an electric motor translates to the need for inexpensive batteries with high energy densities, long operating lifetimes, and capability of operating in a wide range of conditions. Although rechargeable battery cells offer a number of advantages over disposable batteries, this type of battery is not without its drawbacks. In general, most of the disadvantages associated with rechargeable batteries are due to the battery chemistries employed, as these chemistries tend to be less stable than those used in primary cells. Secondary battery cells such as lithium-ion cells tend to be more prone to thermal management issues which occur when elevated temperatures trigger heat-generating exothermic reactions, raising the temperature further and potentially triggering more deleterious reactions. During such an event, a large amount of thermal energy is rapidly released, heating the entire cell up to a temperature of 850° C. or more. Due to the increased temperature of the cell undergoing this temperature increase, the temperature of adjacent cells within the battery pack will also increase. If the temperature of these adjacent cells is allowed to increase unimpeded, they may also enter into an unacceptable state with exceedingly high temperatures within the cell, leading to a cascading effect where the initiation of temperature increases within a single cell propagate throughout the entire battery pack. As a result, power from the battery pack is interrupted and the system employing the battery pack is more likely to incur extensive collateral damage due to the scale of damage and the associated release of thermal energy. In a worst case scenario, the amount of generated heat is great enough to lead to the combustion of the battery as well as materials in proximity to the battery.

Furthermore, due to the characteristics of the lithium ion batteries, the secondary battery pack operates within an ambient temperature range of −20° C. to 60° C. However, even when operating within this temperature range, the secondary battery pack may begin to lose its capacity or ability to charge or discharge should the ambient temperature fall below 0° C. Depending on the ambient temperature, the life cycle capacity or charge/discharge capability of the battery may be greatly reduced as the temperature stays below 0° C. Nonetheless, it may be unavoidable that the lithium ion battery be used where the ambient temperature falls outside the optimum ambient temperature range which is between 20° C. to 25° C. These factors not only greatly shorten the driving range of vehicle, but also cause a great damage to battery Deterioration in energy and power available at lower temperatures is attributed to reduction in capacity and increase in internal resistance.

Alluding to the above, in a battery or battery assembly with multiple cells, significant temperature variances can occur from one cell to the next, which is detrimental to performance of the battery pack. To promote long life of the entire battery pack, the cells must be below a desired threshold temperature. To promote pack performance, the differential temperature between the cells in the secondary battery pack should be minimized. However, depending on the thermal path to ambient, different cells will reach different temperatures. Further, for the same reasons, different cells reach different temperatures during the charging process. Accordingly, if one cell is at an increased temperature with respect to the other cells, its charge or discharge efficiency will be different, and, therefore, it may charge or discharge faster than the other cells. This will lead to decline in the performance of the entire pack.

A number of approaches have been employed to either reduce the risk of thermal issues, or reduce the risk of thermal propagation. These can be found in U.S. Pat. No. 8,367,233 which discloses a battery pack thermal management system that comprises at least one enclosure failure port integrated into at least one wall of a battery pack enclosure, where the enclosure failure port(s) remains closed during normal operation of the battery pack, and opens during a battery pack thermal event, thereby providing a flow path for hot gas generated during the thermal event to be exhausted out of the battery pack enclosure in a controlled fashion.

Another approach is to develop new cell chemistries and/or modify existing cell chemistries. Yet another approach is to provide additional shielding at the cell level, thus inhibiting the flow of thermal energy from the cell undergoing thermal management issues propagating to adjacent cells. Still yet another approach, is to use a spacer assembly to maintain the position of the battery undergoing the thermal event in its predetermined location within the battery pack, thereby helping to minimize the thermal effects on adjacent cells.

Thermally insulating a battery pack has also been described to reduce the risk of thermal excursions or their propagation. For example, document US 2007/0259258 describes a battery of lithium generators in which the generators are stacked one on another and this stack is held in position being surrounded by polyurethane foam. An embodiment is also disclosed in which cooling fins are inserted between two generators.

Document DE 202005010708 describes a starter lead-acid electrochemical generator and an electrochemical generator for industrial use whose housing contains plastic foam such as polypropylene or polyvinyl chloride having closed pores.

Document US2012/0003508 describes a battery of lithium electrochemical generators including a casing; a plurality of lithium electrochemical generators housed in the casing, each generator including a container; a rigid, flame-retardant foam with closed porosity formed of an electrically insulating material filling the space between the inner wall of the casing and the free surface of the side wall of the container of each electrochemical generator, the foam covering the free surface of the side wall of the container of each electrochemical generator over a length representing at least 25% of the height of the container. According to one embodiment, the foam consists of a material chosen from the group comprising polyurethane, epoxy, polyethylene, melamine, polyester, formophenol, polystyrene, silicone or a mixture thereof, polyurethane and the mixture of polyurethane and epoxy being preferred. The expansion of polyurethane resin for foam-form is described using the following chemical routes to obtain the foam:
   a) via chemical route, i.e. the reaction of water on isocyanate producing $CO_2$ which will cause the polyurethane to foam;
   b) via physical route, i.e. vaporization of a liquid with low boiling point under the action of heat produced by the exothermal reaction between isocyanate and the hydrogen-donor compound, or
   c) via injection of air.

However, rigid foams which are typically produced by reacting for example a polyisocyanate with an isocyanate reactive material such as polyol in the presence of a blowing agent do not exhibit the high compression set required when foams are used to minimize the adverse effect of any fire and explosion linked to a thermal event.

In document U.S. Pat. No. 4,418,127 a modular lithium battery is described and having a plurality of cells, having electrical connecting means connecting the cells to output terminals, and venting means for releasing discharge byproducts to a chemical scrubber. Stainless steel cell casings are potted in an aluminum modular case with a syntactic epoxy foam, said foam being syntactic in nature to reduce weight and which has incorporated therein microballoons composed of compositions selected from the group consisting of glass and ceramics, and additives to reduce flammability.

Another major issue in the emerging electrical vehicle field is linked to the drivetrains used which integrate motor, automated manual transmission, shafts, and wheels with the final drive to control speed and generate larger torque for driving the vehicle. The main difference compared to traditional fuel-consuming vehicles is that there is no clutch or hydraulic torque converter in electric vehicles so the overall system configuration is less elastic inherently as the motor and the transmission system are directly mechanically coupled. This configuration has little passive damping effect that can dampen disturbances and avoid oscillations, which are mostly noticeable during travel in the low speed range. Indeed, the dominating sound is the magnetic noise which generates a whining noise at high frequencies. A vehicle running only with an electric motor will also have less masking sound at low frequencies. This means that other noise requirements on for example component noise such as liquid or air cooling/heating for the electrical batteries must be changed accordingly. The noise during regeneration (battery charging) at coast down is also important. Therefore, due to the low damping in an electrical vehicle and lack of passive damping hardware as compared with a conventional vehicle, a damping control strategy is needed to minimize the drivetrain oscillations.

While a number of approaches have been adopted to try to lower the risk of thermal incursions as well as thermal energy propagation throughout the battery pack, it is critical that if a pack-level thermal event does occur, personal and property risks are minimized. As the number of cells in a battery increases, and as the size of the cells increases, so does the necessity and benefit of providing suitable thermal management.

Furthermore, there is still a need to better insulate battery cells, in particular lithium-ion batteries from the adverse effect of low temperature that are met when the weather reaches severe low temperature that could reach −20° C. and even lower.

In this context, one of the essential objectives of the present invention is to provide a new battery pack that will provide suitable thermal management and minimize personal and property risks due to uncontrolled thermal events as it is still awaited.

Another essential objective of the invention is to provide a new battery pack that will provide damping control to minimize the drivetrain oscillations and a better efficiency in controlling the propagation of noise arising from electrical batteries while they are used.

With the present invention, it is sought that the claimed secondary battery pack will address said problems linked to uncontrolled thermal excursions, in particular for lithium batteries, will present efficient low temperature insulation properties and will provide a damping control strategy to minimize the drivetrain oscillations.

All these objectives, among others, are achieved by the present invention, which relates to a secondary battery pack comprising:
   at least one battery module casing 102 in which is disposed a plurality of battery cells 103 which are electrically connected to one another, a silicone rubber syntactic foam comprising a silicone rubber binder and hollow glass beads, and said silicone rubber syntactic foam fills partially or fully the open space of said battery module casing 102 and/or covering partially or totally said battery cells 103 and/or covering partially or totally said module casing 102, and optionally a lid covering the battery module casing 102.

To achieve this objective, the Applicant demonstrated, to its credit, entirely surprisingly and unexpectedly, that the choice of silicone rubber as a binder for a syntactic foam comprising hollow glass beads makes it possible to overcome problems that were not solved by similar batteries using organic rubber syntactic foam.

As used herein, the term "silicone rubber" includes the crosslinked product of any crosslinkable silicone composition. By "silicone rubber syntactic foam" it is meant a matrix made of silicone rubber in which is dispersed hollow glass beads.

Furthermore, it is well known that the driving range of an electric vehicle between charges is calculated at ambient temperature. Electric vehicle drivers are being made aware that frigid temperature reduces the available mileage. This loss is not only caused by heating the cabin electrically but by the inherent slowing of the battery's electrochemical reaction, which reduces the capacity while cold. So, the specific choice of silicone rubber as a binder within said syntactic foam makes it possible for said foam to exhibits excellent insulation in regards to low temperature close or below the freezing point.

Another advantage of using silicone rubber binders over organic rubber binders for a syntactic foam could be exemplified with the embrittlement (or loss of ductility) point, which is between −20° C. to −30° C. for typical organic rubber binder compared to −60° C. to −70° C. for binders according to the invention.

Another advantage is also linked to physical properties such as elasticity which remain efficient for a silicone rubber binder even at temperatures at which organic rubber binders turn brittle.

Another advantage of using a silicone syntactic foam according to the invention is that it has a very low water absorption and hence does isolate perfectly the battery cells from undesired water for its optimum uses. Indeed, contrary to silicone syntactic foams, a standard silicone foam contains only blown gas bubbles and have the voids completely, or at least partly, connected to each other, so with an ability to absorb and diffuse water, feature that makes it difficult to use it within an electrical vehicle in which the battery packs are most often positioned underneath the vehicle or in the vehicle floor and then rainy driving conditions could raise issues with such materials.

As differences in temperatures affect the resistance, self-discharge rate, coulombic efficiency, as well as the irreversible capacity and power fade rates of battery cells, over a wide range of chemistries, the secondary battery pack according to the invention allows for uniform thermal conditions for all cells in a battery pack or module. The likelihood of cell state of charge imbalance and of early failure of non-defective cells is therefore further minimized.

According to a preferred embodiment, said silicone rubber syntactic foam is used as a potting material disposed either in said battery module casing 102 to at least partially encapsulate said plurality of battery cells 103 and/or outside the battery module casing 102 so as to at least partially encapsulate the said battery module casing 102.

Indeed, the silicone rubber syntactic foam fills partially or fully the open space of said battery module casing and/or covering partially or totally said battery cells. The silicone rubber binder provides the syntactic foam with mechanical flexibility and thermal stability over a broad temperature range (e.g. from −70° C. to 200° C.). Additionally, the decomposition of the silicone rubber binder at temperatures of thermal excess (up to 850° C.) into silicon dioxide and silicon oxide absorbs a large amount of heat. Therefore, the heat diffusion from the unit cell to the neighboring unit cells can be effectively insulated by a thermal insulation barrier which is said silicone rubber syntactic foam. The thermal excursions are not propagated through the entire battery module and then threatening the safety of the user is thus prevented. In addition, for some battery modules having control circuit boards disposed in the battery module casing, the silicone rubber syntactic foam of the disclosure can be disposed between the battery cells and the circuit board and between battery cells and the connecting circuit to reduce the battery heating problem caused by the circuit board and the circuit.

The silicone formulation contains hollow glass beads and in a preferred embodiment said hollow glass beads have melting points similar to that of a thermal event occurring in a battery or a group of batteries in a pack so heating will soften and melt the glass reducing heat transfer and protecting other batteries around the overheating battery.

According to a preferred embodiment, said battery cells 103 are of lithium-ion type.

According to another preferred embodiment, the secondary battery pack according to invention, further comprising a plurality of heat dissipation members which are disposed at two or more interfaces between the battery cells, and at least one heat exchange member integrally interconnecting the heat dissipation members which is mounted to one side of the battery module casing 102, whereby heat generated from the battery cells during the charge and discharge of the battery cells is removed by the heat exchange member. It allows for cooling of the battery cells with higher efficiency than conventional cooling systems even with no spaces between the battery cells or with very small spaces between the battery cells, thereby maximizing heat dissipation efficiency of the secondary battery pack and allowing to further limit free space within said secondary battery pack.

According to another preferred embodiment, the heat dissipation members according to the invention are made of a thermally conductive material exhibiting high thermal conductivity and the heat exchange member is provided with one or more coolant channels for allowing a coolant such as a liquid or a gas to flow there.

Heat dissipation members according to the invention are not particularly restricted as long as each of the heat dissipation members is made of a thermally conductive material such as a metal plate exhibiting high thermal conductivity.

Preferably, the heat exchange member is provided with one or more coolant channels for allowing a coolant to flow there through. For example, coolant channels for allowing a liquid coolant, such as water, to flow there through may be formed in the heat exchange member, thereby providing an excellent cooling effect with high reliability as compared with a conventional air-cooling structure.

According to another preferred embodiment, the secondary battery pack according to the invention, further comprising a coolant inlet manifold, a coolant outlet manifold and a plurality of thermal exchange tubes as heat dissipation members and extending between the inlet and outlet manifolds, said thermal exchange tubes are disposed at one or more interfaces between the battery cells and have a coolant passing through to exchange heat generated from the battery cells during the charge and discharge of the battery cells.

Hollow glass beads are employed in the syntactic foam of this invention, and function to reduce the density of the foam. Hollow glass beads, and in particular hollow glass microspheres are well suited for this application because, in addition to having excellent isotropic compressive strengths, they have the lowest density of any filler that would be useful in the manufacture of high compressive strength syntactic foam. The combination of high compressive strength and low density make hollow glass microspheres the filler with numerous advantages according to the invention.

According to one embodiment, hollow glass beads are hollow borosilicate glass microspheres also known as glass bubbles or glass microbubbles.

According to another embodiment, the hollow borosilicate glass microspheres have true densities ranging from 0.10 gram per cubic centimeter (g/cc) to 0.65 gram per cubic centimeter (g/cc).

The terms "true density" is the quotient obtained by dividing the mass of a sample of glass bubbles by the true volume of that mass of glass bubbles as measured by a gas pycnometer. The "true volume" is the aggregate total volume of the glass bubbles, not the bulk volume.

According to another embodiment, the level of hollow glass beads is up to 80% volume loading in the silicone rubber syntactic foam or of the liquid crosslinkable silicone composition precursor of said silicone rubber syntactic foam as described below, and most preferably between 5% and 70% by volume of the silicone rubber syntactic foam or of the liquid crosslinkable silicone composition precursor of said silicone rubber syntactic foam as described below.

According to a preferred embodiment, hollow glass beads are chosen from the 3M™ Glass Bubbles Floated Series (A16/500, G18, A20/1000, H20/1000, D32/4500 and H50/10,000EPX glass bubbles products) and 3M™ Glass Bubbles Series (such as K1, K15, S15, S22, K20, K25, S32, S35, K37, XLD3000, S38, S38HS, S38XHS, K46, K42HS, S60, S60HS, iM16K and iM30K glass bubbles products) sold by 3M Company. Said glass bubbles exhibit various crush strengths ranging from 1.72 megapascal (250 psi) to 68.95 megapascals (10,000 psi) at which ten percent by volume of the first plurality of glass bubbles collapses.

According to a preferred embodiment said glass bubbles are chosen among those exhibiting crush strengths ranging from 1.72 megapascal (250 psi) to 68.95 megapascals (4000 psi) at which ten percent by volume of the first plurality of glass bubbles collapses.

According to a most preferred embodiment, hollow glass beads are chosen from the 3M™ Glass Bubbles series, S15, K25, S32 and XLD3000.

To fill the free spaces with silicone rubber syntactic foam according to the invention, it is possible:
 a) either to use a liquid crosslinkable silicone composition precursor of a silicone rubber syntactic foam comprising hollow glass beads according to the invention, which, after injection or free flow comes to fill the free spaces and cures via crosslinking,
 b) or to use a machined or previously molded block of a silicone rubber syntactic foam comprising hollow glass beads that is inserted in the casing at the time of assembly.

The use of a liquid crosslinkable silicone composition precursor of a silicone rubber syntactic foam comprising hollow glass beads in the battery facilitates the filling thereof compared with a standard liquid crosslinkable silicone precursor of a silicone foam as the foaming process of a standard foam creates blown gas bubbles and have the voids completely, or at least partly, connected to each other which causes numerous defects within the obtained silicone foam and filling problems.

Indeed, standard silicone foams are obtained by several methods, for example, by adding a thermally decomposable blowing agent, or by molding and curing while generating hydrogen gas by-product. In the method of adding a thermally decomposable blowing agent, the toxicity and odor of decomposed gases are problems. The method of utilizing hydrogen gas by-product during the curing step suffers from such problems as the potential explosion of hydrogen gas and the careful handling of uncured composition during shelf storage. Further, the gas generating method encounters difficulty in forming controlled uniform cells.

The use of expandable silicone rubber syntactic foam facilitates the filling of empty space within the battery pack since the swell pressure pushes the foam into all the cavities and recesses of the geometry to be filled. Also, this method allows any geometry to be filled which is not possible using prefabricated blocks.

Silicone rubber which is used as a binder within the syntactic foam according to the invention, are often referred to as silicone elastomers, are composed of three to four essential ingredients. These ingredients are (i) one or more reactive silicone polymer, (ii) eventually one or more filler (s) (iii) a crosslinking agent, and (iv) a catalyst. Generally, there exist two main types of silicone rubber compositions which are heat vulcanized, (HTV) silicone rubber and room temperature vulcanizing (RTV) silicone rubber. Heat vulcanized or high temperature vulcanizing (HTV) silicone rubber compositions are often further differentiated as high consistency rubber (HCR) or liquid silicone rubber (LSR) depending on uncured viscosity of the composition. The terms "room temperature vulcanizing" (RTV) silicone rubber compositions, however may be misleading as some RTV compositions can require a modicum of heat to progress the reaction at a reasonable rate.

The silicone rubber binder in which hollow glass beads are dispersed may be obtained by curing either an addition curing type organopolysiloxane composition, a peroxide curing type organopolysiloxane composition or a condensation type organopolysiloxane composition.

Such silicone compositions are well known by those skilled in the art of the silicone field. The addition curing type organopolysiloxane composition is preferably defined as primarily comprising (1) 100 parts by weight of an organopolysiloxane having at least two alkenyl groups attached to silicon atoms in a molecule, (2) 0.1 to 50 parts by weight of an organo-hydrogenpolysiloxane having at least two, preferably at least three hydrogen atoms attached to silicon atoms (i.e., SiH groups) in a molecule, and (3) a catalytic amount of an addition reaction catalyst. The peroxide curing type organopolysiloxane composition is preferably defined as primarily comprising (1) 100 parts by weight of an organopolysiloxane having at least two alkenyl groups attached to silicon atoms in a molecule, and (2) a catalytic amount of an organic peroxide. The condensation type organopolysiloxane compositions that crosslink via polycondensation generally involve a silicone oil, generally a polydimethylsiloxane, with hydroxyl end groups, optionally prefunctionalized with a silane so as to have hydrolyzable and condensable ends and a crosslinking agent, a polycondensation catalyst, conventionally a tin salt or an alkyl titanate.

According to a preferred embodiment, said silicone rubber syntactic foam is obtained by curing an addition curing type organopolysiloxane composition X. This embodiment offers several advantages over one part systems (condensation type organopolysiloxane compositions), especially in production environments. Since it is the catalyst and not moisture, as in the case of a condensation curing silicone, that causes the cure, they have no issue with section thickness. Indeed, they are advantageously used for applications such as potting, encapsulating and large castings. Addition curing type organopolysiloxane compositions do not release reaction by-products so they can cure in closed environments. Their cure can also be greatly accelerated by heat curing however curing can be easily obtained without the need of heat, so at ambient temperature 20° C. (+/−5° C.), by adjusting the level of inhibitor and/or catalyst which is a great advantage compared to peroxide curing which needs temperature above 90° C.

According to another preferred embodiment, the addition curing type organopolysiloxane composition X comprises:
- a) at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups,
- b) at least one silicon compound B having at least two and preferably at least three hydrogen atoms bonded to silicon per molecule,
- c) hollow glass beads D, and preferably hollow borosilicate glass microspheres, d) a hydrosilylation catalyst C,
- e) optionally at least one cure rate controller G which slows the curing rate of the silicone composition,
- f) optionally at least one reactive diluent E which reacts through hydrosilylation reaction, and
- g) optionally at least one additive H such as a pigment, a dye, clays, a surfactant, hydrogenated castor oil, wollastonite, aluminium trihydrate, magnesium hydroxide, halloysite, huntite hydromagnesite, expandable graphite, zinc borate, mica or a fumed silica.

According to another preferred embodiment, the addition curing type organopolysiloxane composition X comprises:
- a) at least one organopolysiloxane A of the following formula:

(A)

in which:
R and R'', are chosen independently of one another from the group consisting of $C_1$ to $C_{30}$ hydrocarbon radical, and preferably R and R are an alkyl group chosen from the group consisting of methyl, ethyl, propyl, trifluoropropyl, and phenyl, and most preferably R is a methyl group,
R' is a $C_1$ to $C_{20}$ alkenyl radical, and preferably R' is chosen from the group consisting of vinyl, allyl, hexenyl, decenyl and tetradecenyl, and most preferably R' is a vinyl radical, and
n is an integer having a value from 5 to 1000, and preferably from 5 to 100,

- b) at least one silicon compound B comprising at least two hydrogen atoms bonded to silicon per molecule, and preferably a mixture of two silicon compounds B one comprising two telechelic hydrogen atoms bonded to silicon per molecule with no pendent hydrogen atoms bonded to silicon per molecule and the other comprising at least three hydrogen atoms bonded to silicon per molecule,
- c) an effective amount of hydrosilylation catalyst C, and preferably a platinum based hydrosilylation catalyst C.
- d) hollow glass beads D, and preferably hollow borosilicate glass microspheres,
- e) eventually and preferably at least one reactive diluent E for reducing the viscosity of the composition and which reacts through hydrosilylation reaction and is chosen from the group consisting of:
  - a silicon compound comprising a single silicon hydride group per molecule, and
  - an organic compound containing a single ethylenically unsaturated group, preferably said organic compound is an organic α-olefin containing from 3 to 20 carbon atoms, and most preferably chosen from the group consisting of dodecene, tetradecene, hexadecene, octadecene and a combination of these and all with a terminal vinyl group,
  - an organopolysiloxane having a single telechelic alkenyl group, and preferably said telechelic alkenyl group is chosen from the group consisting of vinyl, allyl, hexenyl, decenyl and tetradecenyl, and most preferably is a vinyl group,
- f) optionally at least one additives H such as a pigment, a dye, clays, a surfactant, hydrogenated castor oil, wollastonite, aluminium trihydrate, magnesium hydroxide, halloysite, huntite hydromagnesite, expandable graphite, zinc borate, mica or a fumed silica, and
- g) optionally at least one cure rate controller G which slows the curing rate of the silicone composition.

According to another preferred embodiment, the reactive diluent E:
is chosen from the group consisting of dodecene, tetradecene, hexadecene, octadecene or a combination of these and all having a terminal vinyl group, or
is a liquid organopolysiloxane with formula I

I

In which:
R are $R^2$, are chosen independently of one another from a $C_1$ to $C_{30}$ hydrocarbon radical, and preferably they are chosen from the group consisting of methyl, ethyl, propyl, trifluoropropyl and phenyl, and most preferably are methyl groups,
$R^1$ is a $C_1$ to $C_{20}$ alkenyl radical, and preferably $R^1$ is chosen from the group consisting of vinyl, allyl, hexenyl, decenyl, or tetradecenyl, and most preferably $R^1$ is vinyl, and
x is between 0 and 100, and is chosen so that it will lower the viscosity of addition curing type organopolysiloxane composition X compared to same composition without the reactive diluent.

According to a preferred embodiment organopolysiloxane A is chosen from the group of dimethylpolysiloxanes containing dimethylvinylsilyl end groups.

According to another preferred embodiment, wherein:
- the viscosity at 25° C. of said organopolysiloxane A is between 5 mPa·s and 60000 mPa·s; and preferably between 5 mPa·s and 5000 mPa·s, and most preferably between 5 mPa·s and 350 mPa·s,
- the viscosity at 25° C. of said silicon compound B comprising two telechelic hydrogen atoms bonded to silicon per molecule with no pendent hydrogen atoms bonded to silicon per molecule is between 5 and 100 mPa·s, and
- the viscosity at 25° C. of said silicon compound B comprising at least three hydrogen atoms bonded to silicon per molecule is between 5 and 2000 mPa·s.

All the viscosities under consideration in the present specification correspond to a dynamic viscosity magnitude that is measured, in a manner known per se, at 25° C., with a machine of Brookfield type. As regards to fluid products, the viscosity under consideration in the present specification is the dynamic viscosity at 25° C., known as the "Newtonian" viscosity, i.e. the dynamic viscosity that is measured, in a manner known per se, at a sufficiently low shear rate gradient so that the viscosity measured is independent of the rate gradient.

According to a preferred embodiment, the viscosities at 25° C. of said organopolysiloxane A and said silicon compound B comprising at least two hydrogen atoms bonded to silicon per molecule are chosen so that the viscosity at 25° C. of the addition curing type organopolysiloxane composition X is between 500 mPa·s and 300,000 mPa·s. so that it can be injected into the battery module casing 102. If the option of pouring the composition within the battery module casing 102 is chosen, then the components of said addition curing type organopolysiloxane composition X are chosen so that its viscosity is between 500 mPa·s to 5000 mPa·s and most preferably between 500 mPa·s to 2500 mPa·s.

Examples of hydrosilylation catalysts C are hydrosilylation catalysts such as Karstedt's catalyst shown in U.S. Pat. No. 3,715,334 or other platinum or rhodium catalysts known to those in the art, and also including microencapsulated hydrosilylation catalysts for example those known in the art such as seen in U.S. Pat. No. 5,009,957. However, hydrosilylation catalysts pertinent to this invention can contain at least one of the following elements: Pt, Rh, Ru, Pd, Ni, e.g. Raney Nickel, and their combinations. The catalyst is optionally coupled to an inert or active support. Examples of preferred catalysts which can be used include platinum type catalysts such as chloroplatinic acid, alcohol solutions of chloroplatinic acid, complexes of platinum and olefins, complexes of platinum and 1,3-divinyl-1,1,3,3-tetramethyldisiloxane and powders on which platinum is supported, etc. The platinum catalysts are fully described in the literature. Mention may in particular be made of the complexes of platinum and of an organic product described in U.S. Pat. Nos. 3,159,601, 3,159,602 and 3,220,972 and European Patents EP-A-057,459, EP-188,978 and EP-A-190,530 and the complexes of platinum and of vinylated organopolysiloxane described in U.S. Pat. Nos. 3,419,593, 3,715,334, 3,377,432, 3,814,730, and 3,775,452, to Karstedt. In particular, platinum type catalysts are especially desirable.

Examples of cure rate controller G, which are also known as inhibitor, designed to slow the cure of the compounded silicone if needed. Cure rate controllers are well known in the art and examples of such materials can be found in U.S. Patents. U.S. Pat. No. 3,923,705 refers to the use of vinyl contained cyclic siloxanes. U.S. Pat. No. 3,445,420 describes the use of acetylenic alcohols. U.S. Pat. No. 3,188,299 shows the effectiveness of heterocyclic amines. U.S. Pat. No. 4,256,870 describes alkyl maleates used to control cure. Olefinic siloxanes can also be used as described in U.S. Pat. No. 3,989,667. Polydiorganosiloxanes containing vinyl radicals have also been used and this art can be seen in U.S. Pat. Nos. 3,498,945, 4,256,870, and 4,347,346. Preferred inhibitors for this composition are methylvinylcyclosiloxanes, 3-methyl-1-butyn-3-ol, and 1-ethynyl-1-cyclohexanol with the most preferred being the 1,3,5,7-tetramethyl-1,3,5,7-tetravinyl-cyclotetrasiloxane in amounts from 0.002% to 1.00% of the silicone compound depending on the cure rate desired.

The preferred cure rate controller G is chosen among:
1,3,5,7-tetramethyl-1,3,5,7-tetravinyl-cyclotetrasiloxane.
3-methyl-1-butyn-3-ol, and
1-ethynyl-1-cyclohexanol.

To obtain a longer working time or "pot life", the quantity of the cure rate controller G is adjusted to reach the desired "pot life". The concentration of the catalyst inhibitor in the present silicone composition is sufficient to retard curing of the composition at ambient temperature without preventing or excessively prolonging cure at elevated temperatures. This concentration will vary widely depending on the particular inhibitor used, the nature and concentration of the hydrosilylation catalyst, and the nature of the organohydrogenopolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for a particular inhibitor in a given silicone composition can be readily determined by routine experimentation.

According to a preferred embodiment, for said addition curing type organopolysiloxane composition X the proportions in weight of the organopolysiloxane A, the reactive diluent E, when it is present, and the silicon compound B are such that the overall molar ratio of the hydrogen atoms bonded to the silicon to the overall alkenyl radicals bonded to the silicon is within a range from 0.35 to 10, and preferably within a range from 0.4 to 1.5.

Some additives H such as a pigment, a dye, clays, a surfactant, hydrogenated castor oil, wollastonite or a fumed silica (which modify the flow of the compounded silicone product) can also be used within said addition curing type organopolysiloxane composition X.

By "dye" it is meant a colored or fluorescent organic substance only, which impart color to a substrate by selective absorption of light. By "pigment" it is meant a colored, black, white or fluorescent particulate organic or inorganic solids which usually are insoluble in, and essentially physically and chemically unaffected by, the vehicle or substrate in which they are incorporated. It alters appearance by selective absorption and/or by scattering of light. A pigment generally retains a crystal or particulate structure throughout the coloration process. Pigments and dyes are well known in the art and need not be described in detail herein.

Clays are products that are already well known per se, which are described, for example, in the publication "Mineralogie des argiles [Mineralogy of clays], S. Caillere, S. Henin, M. Rautureau, 2nd Edition 1982, Masson". Clays are silicates containing a cation that may be chosen from calcium, magnesium, aluminium, sodium, potassium and lithium cations, and mixtures thereof. Examples of such products that may be mentioned include clays of the smectite family such as montmorillonites, hectorites, bentonites, beidellites and saponites, and also of the vermiculite, stevensite and chlorite families. These clays may be of natural or synthetic origin. The clay is preferably a bentonite or a hectorite, and these clays may be modified with a chemical compound chosen from quaternary amines, tertiary amines, amine acetates, imidazolines, amine soaps, fatty sulfates, alkyl aryl sulfonates and amine oxides, and mixtures thereof. Clay which can be used according to the invention, of synthetic hectorites (also known as laponites), such as the products sold by Laporte under the name Laponite XLG, Laponite RD and Laponite RDS (these products are sodium magnesium silicates and in particular lithium magnesium sodium silicates); bentonites, such as the product sold under the name Bentone HC by Rheox; magnesium aluminium silicates, in particular hydrated, such as the product sold by R.T. Vanderbilt Company under the name Veegum Ultra, or calcium silicates and in particular that in synthetic form sold by the company CELITE ET WALSH ASS under the name Micro-Cel C.

Many silicone polyether surfactants are available, but a preferred silicone polyether for thickening a silicone compound of this invention would be SP 3300 from Elkem Silicones USA.

Another preferred additive H is a rheology modifier such as Thixcin R, a hydrogenated castor oil, from Elementis Specialties, New Jersey, USA.

Wollastonite, also known as calcium metasilicate, is a naturally occurring mineral could be added as a flame retardant (quantities added will varies according to the application and will range between 1 part by weight to 15 parts by weight based on 100 parts by weight of the addition curing type organopolysiloxane composition X. The wollastonite which could be used in this invention is a mined form, having an acicular morphology, that is a needle-like shape. Preferred wollastonite grades are selected from materials supplied by NYCO® Minerals, Inc., Willsboro N.Y.

Aluminium trihydrate (ATH) is a common flame retardant filler. It decomposes when heated above 180-200° C. at which point it absorbs heat and releases water to quench the flame. Magnesium hydroxide (MDH) has a higher thermal stability than ATH. Endothermic (heat absorbing) decomposition starts at 300° C. whereupon water is released which could act as a fire retardant.

Huntite/Hydromagnesite blends $(Mg_3Ca(CO_3)_4/Mg_5(CO_3)_4(OH)_2 \cdot 4H_2O)$. Huntite and hydromagnesite occur, almost invariably, as mixtures in nature. The hydromagnesite starts to decompose between 220° C. (open air) and 250° C. (under pressure in an extruder), which is high enough so that it can be used as a flame retardant. The hydromagnesite gives off water and absorbs heat, much like ATH and MDH do. In contrast, the huntite decomposes above 400° C., absorbing heat but liberating carbon dioxide.

Fumed silicas can also be used as additive H for changing the rheology of these materials. Fumed silicas can be obtained by high-temperature pyrolysis of a volatile silicon compound in an oxyhydrogen flame, producing a finely divided silica. This process makes it possible in particular to obtain hydrophilic silicas which have a large number of silanol groups at their surface which would tend to thicken a silicone composition more than silica with low levels of silanol. Such hydrophilic silicas are sold for example under the names Aerosil 130, Aerosil 200, Aerosil 255, Aerosil 300 and Aerosil 380 by Degussa and Cab-O-Sil HS-5, Cab-O-Sil EH-5, Cab-O-Sil LM-130, Cab-O-Sil MS-55 and Cab-O-Sil M-5 by Cabot. It is possible to chemically modify the surface of the said silica via a chemical reaction which brings about a reduction in the number of silanol groups. It is possible in particular to replace silanol groups with hydrophobic groups: a hydrophobic silica is then obtained. The hydrophobic groups can be:

trimethylsiloxyl groups, which are obtained in particular by treating fumed silica in the presence of hexamethyldisilazane. Silicas thus treated are known as "Silica silylate" according to the CTFA (6th edition, 1995). They are sold for example under the references Aerosil R812 by Degussa and Cab-O-Sil TS-530 by Cabot, or dimethylsilyloxyl or polydimethylsiloxane groups, which are obtained in particular by treating fumed silica in the presence of polydimethylsiloxane, or methyldichlorosilane.

Silicas thus treated are known as "Silica dimethyl silylate" according to the CTFA (6th edition, 1995). They are sold for example under the references Aerosil R972 and Aerosil R974 by Degussa, and Cab-O-Sil TS-610 and Cab-O-Sil TS-720 by Cabot. The fumed silica preferably has a particle size that may be nanometric to micrometric, for example ranging from about 5 to 200 nm.

According to another preferred embodiment said addition curing type organopolysiloxane composition X is stored before use as a multi-component RTV comprising at least two separate packages which are preferably airtight, whereas the hydrosilylation catalyst C is not present in the same package with silicon compound B or with reactive diluent E when it is present and when it is a silicon compound comprising a single silicon hydride group per molecule.

According to another preferred embodiment said addition curing type organopolysiloxane composition X is stored before use as a multi-component RTV comprising at least two separate packages which are preferably airtight:
 a) the first package A1 comprising:
  100 parts by weight of at least one organopolyiloxane A according to the invention and as defined above,
  from 5 to 30 parts by weight of hollow glass beads D according to the invention and as defined above, and
  from 0 to 30 parts and preferably from 5 to 30 parts by weight of at least one reactive diluent E according to the invention and as defined above, and
  from 4 to 150 ppm based on metal platinum of a platinum based hydrosilylation catalyst C.
 b) the second package A2 comprising:
  100 parts by weight of at least one organopolysiloxane A according to the invention and as defined above,
  from 10 to 70 parts by weight of a silicon compounds B one comprising two telechelic hydrogen atoms bonded to silicon per molecule according to the invention and as defined above,
  from 5 to 25 parts by weight of a silicon compounds B comprising at least three hydrogen atoms bonded to silicon per molecule according to the invention and as defined above,
  from 5 to 30 parts by weight of hollow glass beads D according to the invention and as defined above, and
  an effective amount of at least one cure rate controller G which slows the curing rate.

Another object of the invention relates to a process for preparation of a secondary battery pack according to the invention and as described above comprising the steps of:
 a) preparing at least one battery module casing 102 in which is disposed a plurality of battery cells 103 which are electrically connected to one another, b) introducing into the said battery module casing 102 the addition curing type organopolysiloxane composition X as defined in claim 3 or 11, c) filling completely or partially said battery module casing 102, and d) allowing the curing to occur so as to form a silicone rubber syntactic foam comprising a silicone rubber binder and hollow glass beads, and optionally e) covering the battery module casing 102 with a lid.

A preferred embodiment of the above process according to the invention relates to the preparation of the addition curing type organopolysiloxane composition X comprising the steps of:

a) feeding into a base feed line a liquid silicone base MS1 comprising:
  i) at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups,
  ii) hollow glass beads D, and preferably hollow borosilicate glass microspheres D1,
  iii) at least one silicon compound B having at least two and preferably at least three hydrogen atoms bonded to silicon per molecule, and
  iv) optionally a cure rate controller G which slows the curing rate, b) feeding into a catalyst feed line a catalyst master batch MC comprising:
  i) at least one hydrosilylation catalyst C; and
  ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups;

c) feeding into an inhibitor feed line an inhibitor master batch MI comprising:
  i) a cure rate controller G which slows the curing rate; and
  ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups; and d) optionally feeding into an additive feed line an additive masterbatch MA comprising:
  i) at least one additive H such as a pigment, a dye, clays, a surfactant, hydrogenated castor oil, wollastonite, aluminium trihydrate, magnesium hydroxide, halloysite, huntite, hydromagnesite, expandable graphite, zinc borate, mica or a fumed silica, and
  ii) optionally at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups; and e) directing said liquid silicone base MS1, said catalyst master batch MC and said inhibitor master batch MI and optionally said additive masterbatch MA into a tank to obtain the addition curing type organopolysiloxane composition X.

The first advantage of said preferred embodiment relies on that the reaction rate of the crosslinking for the addition curing type organopolysiloxane composition X is regulated by the addition of a cure rate controller G. As the addition of this essential component is done via using a specific feed line, the level of inhibitor can be easily modified by the operator which allows him to increase the rate of cure or reduce the temperature at which rapid curing will begin. This is a key advantage as the configuration of the newly designed secondary battery packs involve more and more complex shapes which implies to adjust with caution on a case by case the curing rate.

The second main advantage relies that it is now possible to reduce the level of inhibitor and so to reduce the temperature at which rapid curing begins. This can be important if there are components within the battery pack that are somewhat temperature sensitive.

A preferred embodiment of the above process according to the invention relates to the preparation of the addition curing type organopolysiloxane composition X comprising the steps of:

a) feeding into a base feed line a liquid silicone base MS2 comprising:
  i) at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups, and
  ii) at least one silicon compound B having at least two and preferably at least three hydrogen atoms bonded to silicon per molecule,
  iii) optionally a cure rate controller G which slows the curing rate, b) feeding into a catalyst feed line a catalyst master batch MC comprising:
  i) at least one hydrosilylation catalyst C; and
  ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups;

c) feeding into an inhibitor feed line an inhibitor master batch MI comprising:
  i) a cure rate controller G which slows the curing rate; and
  ii) optionally, at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups; and d) optionally feeding into an additive feed line an additive masterbatch MA comprising:
  i) at least one additive H such as a pigment, a dye, clays, a surfactant, hydrogenated castor oil, wollastonite, aluminium trihydrate, magnesium hydroxide, halloysite, huntite hydromagnesite, expandable graphite, zinc borate, mica or a fumed silica, and ii) optionally at least one organopolysiloxane A having at least two alkenyl groups bonded to silicon per molecule, said alkenyl groups each containing from 2 to 14 carbon atoms, preferably said alkenyl groups are chosen from the group consisting of vinyl, allyl, hexenyl, decenyl and tetradecenyl, and most preferably said alkenyl groups are vinyl groups;

e) directing said liquid silicone base MS2, said catalyst master batch MC and said inhibitor master batch MI and optionally said additive masterbatch MA into a stirring tank; and f) operating said stirring tank, thereby mixing said liquid silicone base MS1, said catalyst master batch MC and said inhibitor master batch MI and optionally said additive masterbatch MA preferably by using a high flow, low-shear mixer, and g) adding hollow glass beads D and preferably hollow borosilicate glass microspheres D1 into said stirring tank, preferably by means using gravity discharge or screw feeder to obtain the addition curing type organopolysiloxane composition X.

All the components of the preferred embodiments of the preparation of the addition curing type organopolysiloxane composition X have been already described above.

According to a preferred embodiment, the secondary battery pack according to the invention is located within a vehicle.

It is understood that the term "vehicle" as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

In another preferred embodiment, the secondary battery pack according to the invention is located in an automotive motor vehicle.

In another embodiment, the secondary battery pack according to the invention is located in an all-electric vehicle (EV), a plug-in hybrid vehicle (PHEV), a hybrid vehicle (HEV).

In another embodiment, the secondary battery pack according to the invention is located in: an aircraft, a boat, a ship, a train or wall unit.

Figure 1:
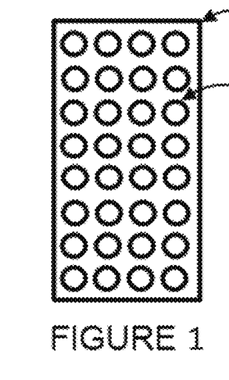
FIG. 1 provides a top view of a secondary battery pack without a lid with batteries inside the pack.
Figure 2:
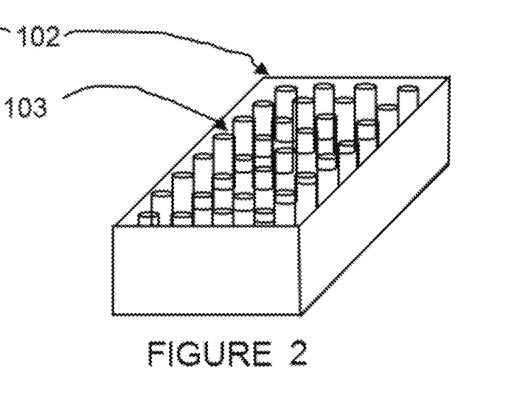
FIG. 2 provides a perspective view of a secondary battery pack with batteries inside the pack.
Figure 3:
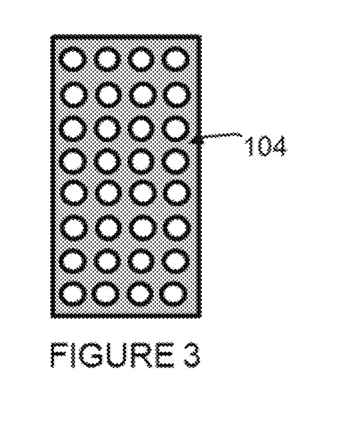
FIG. 3 provides a top view of batteries in a secondary battery pack with silicone rubber syntactic foam according to the invention filling the space between batteries and the remaining space in the pack.
Figure 4:
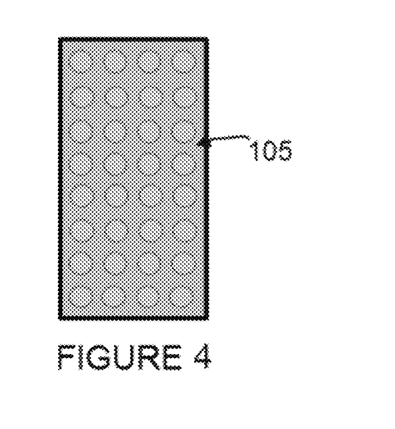
FIG. 4 provides a top view of battery cells in a secondary battery pack covered with silicone rubber syntactic foam according to the invention and with said foam filling the space between batteries and the remaining space in the pack.

FIGS. 1 and 2 show that battery cells 103 can be very close together in a battery module casing 102. In one embodiment of the invention a crosslinkable silicone composition according to the invention and precursor of a lightweight silicone rubber syntactic foam comprising a silicone rubber binder and hollow glass beads is poured into the battery module casing 102 after the batteries have been placed and installed (FIG. 3, 104) and yield to a silicone syntactic foam when it is cured (FIG. 4, 105).

Figure 5:
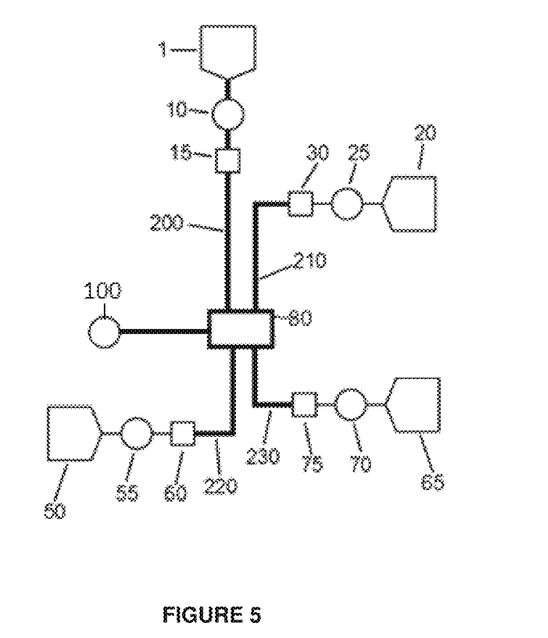
FIGS. 5 and 6 provide a schematic representation of two preferred embodiments of a method for producing an addition curing type organopolysiloxane composition X wherein the inhibitor master batch MI and catalyst master batch MC are separately fed into other components so as to control the curing rate.

FIG. 5 shows a method for producing an addition curing type organopolysiloxane composition X according to one embodiment of the invention wherein said liquid silicone base MS1 is stored in a storage tank 1, said catalyst master batch MC is stored in a storage tank 20, said inhibitor master batch MI is stored in a storage tank 50 and said additive masterbatch MA is stored in a storage tank 65 and are fed separately into their respective feed lines 200, 210, 220 and 230 respectively. The storage tank 1 of the liquid silicone base MS2 is connected to the stirring tank 80 via a feed pump 10, which can be any large displacement pump, and via an optional feed rate adjuster 15. The storage tank 20 of the catalyst master batch MC is connected to the stirring tank 80 via a feed pump 25, which can be any small piston displacement pump, gear pump, micro motion injector pump, or other positive displacement pump, and via an optional feed rate adjuster 30. The storage tank 50 of the inhibitor master batch MI is connected to the stirring tank 80 via a feed pump 55, which can be any small piston displacement pump, gear pump, micro motion injector pump, or other positive displacement pump, and via an optional feed rate adjuster 60. The storage tank 65 of the additive masterbatch MA is connected to the stirring tank 80 via a feed pump 70, which can be any small piston displacement pump, gear pump, micro motion injector pump, or other positive displacement pump, and via an optional feed rate adjuster 75. When said liquid silicone base MS2, said catalyst master batch MC and said inhibitor master batch MI and optionally said additive masterbatch MA are directed into said stirring tank 80; the resulting mixture is mixed preferably by using a high flow, low-shear mixer to yield the addition curing type organopolysiloxane composition X according to the invention. Said composition is now available to be introduced into the said battery module casing 102 by mean 100 which could be either via an injection apparatus or via a pump to allow free flow to fill the free spaces of battery module casing 102 and cures via crosslinking.

Figure 6:
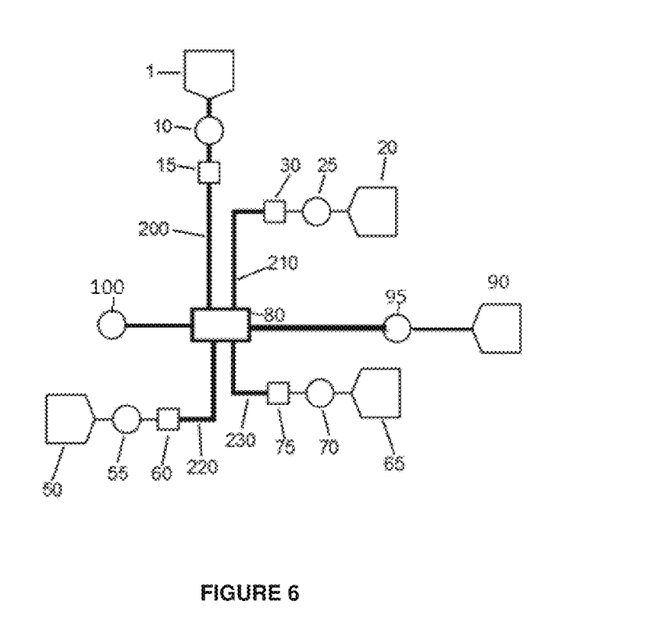

FIG. 6 shows a method for producing an addition curing type organopolysiloxane composition X according to another embodiment of the invention wherein said liquid silicone base MS2 is stored in a storage tank 1, said catalyst master batch MC is stored in a storage tank 20, said inhibitor master batch MI is stored in a storage tank 50 and said additive masterbatch MA is stored in a storage tank 65 and are fed separately into their respective feed lines 200, 210, 220 and 230 respectively. The storage tank 1 of the liquid silicone base MS2 is connected to the stirring tank 80 via a feed pump 10, which can be any large displacement pump, and via an optional feed rate adjuster 15. The storage tank 20 of the catalyst master batch MC is connected to the stirring tank 80 via a feed pump 25, which can be any small piston displacement pump, gear pump, micro motion injector pump, or other positive displacement pump, and via an optional feed rate adjuster 30. The storage tank 50 of the inhibitor master batch MI is connected to the stirring tank 80 via a feed pump 55, which can be any small piston displacement pump, gear pump, micro motion injector pump, or other positive displacement pump, and via an optional feed rate adjuster 60. The storage tank 65 of the additive masterbatch MA is connected to the stirring tank 80 via a feed pump 70, which can be any small piston displacement pump, gear pump, micro motion injector pump, or other positive displacement pump, and via an optional feed rate adjuster 75. When said liquid silicone base MS2, said catalyst master batch MC and said inhibitor master batch MI and optionally said additive masterbatch MA are directed into said stirring tank 80; the resulting mixture is mixed preferably by using a high flow, low-shear mixer. To said resulting mixture, hollow glass beads D and preferably hollow borosilicate glass microspheres D1 which are stored in storage tank 90, which is preferably a hopper, are transferred into said stirring tank 80 either directly by gravity discharge or via screw feeder 95 to yield addition curing type organopolysiloxane composition X according to the invention. Said composition is now available to be introduced into the said battery module casing 102 by mean 100 which could be either via an injection apparatus or via a pump to allow free flow to fill the free spaces of battery module casing 102 and cures via crosslinking.

Other advantages provided by the present invention will become apparent from the following illustrative examples.

EXAMPLES

I) Definition of the Components

Organopolysiloxane A1=polydimethylsiloxane with dimethylvinylsilyl end-units with a viscosity at 25° C. ranging from 80 mPa·s to 120 mPa·s;

Organopolysiloxane A2=polydimethylsiloxane with dimethylvinylsilyl end-units with a viscosity at 25° C. ranging from 500 mPa·s to 650 mPa·s;

Organopolysiloxane B1 (CE) as chain extender=polydimethylsiloxane with dimethylsilylhydride end-units with a viscosity at 25° C. ranging from 7 mPa·s to 10 mPa·s and formula: M'D$_x$M'

In which:

D is a siloxy unit of formula $(CH_3)_2SiO_{2/2}$

M' is a siloxy unit of formula $(CH_3)_2(H) SiO_{1/2}$ and x is an integer ranging from 8 to 11;

Organopolysiloxane B2 (XL) as crosslinker, with a viscosity at 25° C. ranging from 18 mPa·s to 26 mPa·s, over 10 SiH reactive groups are present (in average from 16 to 18 SiH reactive groups): poly(methylhydrogeno) (dimethyl) siloxane with SiH groups in-chain and end-chain (a/a), Hollow glass beads D1: 3M™ Glass Bubbles Series S15, sold by 3M Company, Particle Size (50%) microns by volume=55 microns, Isostatic Crush Strength: Test Pressure 300 psi (2.07 MPa.), True Density (g/cc)=0.15.

Hollow glass beads D2: 3M™ Glass Bubbles Series K25, sold by 3M Company, (Particle Size (50%) microns by volume=55 microns, Isostatic Crush Strength Test Pressure 750 psi, True Density (g/cc)=0.25.

Cure rate controller G1: 1,3,5,7-tetramethyl-1,3,5,7-tetravinyl-cyclotetrasiloxane.

Cure rate controller G2: 1-Ethynyl-1-cyclohexanol (ECH).

Reactive diluent E=1-tetradecene.

Catalyst C: 10% platinum as Karstedt catalyst in 350 cS dimethylvinyldimer, sold by Johnson Matthey Company.

II) Examples Part I

TABLE 1

Inventive two-parts formulation 1 precursor of a silicone rubber syntactic foam

| | Parts by weight |
|---|---|
| Part A | |
| Organopolysiloxane A1 | 81.88 |
| Reactive diluent E | 5.03 |
| Catalyst C | 0.037 |
| hollow glass beads D1 | 13.05 |
| Part B | |
| Organopolysiloxane A1 | 81.88 |
| Organopolysiloxane B2 (XL) | 8.6 |
| Organopolysiloxane B1 (CE) | 53.41 |
| Cure rate controller G1 | 0.01 |
| hollow glass beads D1 | 13.05 |

TABLE 2

Inventive two-parts formulation 2 precursor of a silicone rubber syntactic foam.

| | Parts by weight |
|---|---|
| Part A | |
| Organopolysiloxane A1 | 78.27 |
| Reactive diluent E | 8.62 |
| Catalyst C | 0.063 |
| hollow glass beads D1 | 13.05 |
| Part B | |
| Organopolysiloxane A1 | 69.23 |
| Organopolysiloxane B2 (XL) | 2.46 |
| Organopolysiloxane B1 (CE) | 15.26 |
| Cure rate controller G1 | 0.0029 |
| hollow glass beads D1 | 13.05 |

For two-parts formulation 1, parts A and B were combined as a 6:1 w/w (weight ratio) to prepare the compositions I before curing For two-parts formulation 2, parts A and B were combined as a 1:1 w/w (weight ratio) to prepare the compositions II before curing.

Each formulation1 and 2 were poured before curing inside a battery module casing 102 in which was disposed a plurality of battery cells 103 which were electrically conductively connected to one another. The curing occurred at room temperature to yield a rubber syntactic foam comprising a silicone rubber binder and hollow glass beads which filled fully the open space of said battery module casing 102 and covered totally said battery cells 103.

III) Examples Part II

The following formulations were prepared:

TABLE 3

Formulation 3 - Comparative

| Part A | Percent by weight |
|---|---|
| Organopolysiloxane A1 | 99.8% |
| Catalyst C | 0.2% |
| Total | 100.0% |

| Part B | Percent by weight |
|---|---|
| Organopolysiloxane A1 | 78.0749% |
| Organopolysiloxane B1 (CE) | 19.5550% |
| Organopolysiloxane B2 (XL) | 2.3689% |
| Cure rate controller G2 | 0.0012% |
| Total | 100.0000% |

TABLE 4

Formulation 4 - Invention

| Part A | Percent by weight |
|---|---|
| Organopolysiloxane A1 | 83.6900% |
| Catalyst C | 0.0335% |
| Hollow glass beads D2 | 16.2800% |
| Total | 100.0035% |

| Part B | Percent by weight |
|---|---|
| Organopolysiloxane A1 | 65.21% |
| Organopolysiloxane B1 (CE) | 16.69% |
| Organopolysiloxane B2 (XL) | 1.82% |
| Hollow glass beads D2 | 16.28% |
| Total | 100.00% |

TABLE 5

Formulation 5 - Invention

| Part A | Percent by weight |
|---|---|
| Organopolysiloxane A1 | 80.0396% |
| Catalyst C | 0.1604% |
| Hollow glass beads D2 | 19.8000% |
| Total | 100.0000% |

| Part B | Percent by weight |
|---|---|
| Organopolysiloxane A1 | 62.6161% |
| Organopolysiloxane B1 (CE) | 15.6831% |
| Organopolysiloxane B2 (XL) | 1.8999% |
| Cure rate controller G2 | 0.0010% |
| Hollow glass beads D2 | 19.8000% |
| Total | 100.0000% |

Formulation 3 was mixed at 1:1 mix ratio by weight and cured at room temperature (25° C.) overnight for 16 hours to yield a cured silicone elastomer.

Formulations 4 to 7 were mixed at 1:1 mix ratio by weight and cured at room temperature (25° C.) overnight for 16 hours to yield silicone syntactic foams according to the inventions.

Formulation 8 was prepared by mixing at 1:1 mix ratio by weight the two part component sold by Elkem Silicones under the reference RTV-3040 (2 part component, polyaddition curing system) and cured at room temperature (25° C.) overnight for 16 hours to yield a cured silicone elastomer.

Formulation 9 was prepared by mixing at 1:1 mix ratio by weight the two part component sold by Elkem Silicones under the reference Bluesil™ ESA 7242 (which is a two-component heat curing liquid silicone elastomer that cross-links by a polyaddition) and was cured at room temperature (25° C.) overnight for 16 hours to yield a cured silicone elastomer.

Formulation 10 has been prepared based on Sakrete Concrete The concrete used was from SAKRETE of North America, LLC located in Charlotte, North Carolina. The product is called SAKRETE High Strength Concrete Mix. The concrete sample was made using the following process:

Pour 1 kg of the high strength concrete mix into a container forming an indentation in the center of the concrete.

Enough water was added to obtain a workable mix (70 g).

Material was poured into a 51 mm diameter mold.

The material was worked into voids and then flattened with a metal spatula.

The material was allowed to harden until a thumb print could not be left in the material.

A metal spatula was used to obtain a desired finish and flatness as the material was hardening.

The material was kept moist and underneath plastic for 7 days while constantly being kept at room temperature.

TABLE 8

Physical properties of the cured products

| Cured Samples | Tensile Strength psi | Specific Gravity | Durometer Shore A |
|---|---|---|---|
| Formulation 5 (Invention) | 40.0 | 0.55 | 80 |
| Formulation 7 (Invention) | 18.4 | 0.61 | 62 |
| Formulation 4 (Invention) | 18.9 | 0.67 | 53 |
| Formulation 6 (Invention) | 16.1 | 0.55 | 59 |
| Formulation 3 (Comparative) | Gel | Gel | Gel |
| Formulation 9 (Comparative) | 48.0 | 1.37 | 48 |

TABLE 9

Thermal conductivity measurement of cured samples.

| Cured sample | Bulk Thermal Conductivity (W/m · K) |
|---|---|
| Formulation 5 (Invention) | 0.1266 |
| Formulation 7 (Invention) | 0.1240 |
| Formulation 4 (Invention) | 0.1274 |
| Formulation 6 (Invention) | 0.1203 |
| Formulation 3 (comparative) | 0.1760 |
| Formulation 8 (comparative) | 0.2280 |
| Formulation 9 (comparative) | 0.4261 |
| Formulation 10 (comparative) | 1.9190 |

Thermal conductivity was measured using a Thermtest Hot Disk TPS (Transient Plane Source) 2500S Tester and are quoted in Table 9. Table 9 shows that the example formulations according to the invention (Formulations 4 to 6) have lower thermal conductivity than the comparative materials:

formulation 8 (RTV 3040), formulation 9 (ESA 7242), formulation 10 (Sakrete Concrete) and formulation 3 (ESA 7200).

It is an advantage to have a thermally insulating material. If a battery or multiple batteries in the pack overheat, an insulating material surrounding the battery will help prevent excessive heat from reaching the passenger area of an electric vehicle (car, truck, boat, train, plane, etc.).

Another advantage of the cured formulations 4 to 7 according to the invention is that they can absorb vibration. Resilience is related to vibration. The more resilient a material is, the more vibration is translated through the material. Using a Shore® Model SRI Resiliometer, commonly referred to as a Bayshore Resiliometer, to quickly and accurately measure the "Rubber Property-Resilience by Vertical Rebound" as described in ASTM D2632. The resilience of example according to the invention and comparative materials were measured and the results are disclosed in Table 9. All the formulations were mixed at 1:1 mix ratio by weight and cured at room temperature overnight for 16 hours. A weight drops on the test sample, and rebounds above the test sample when it hits the sample. When the weight hits the sample and bounces high, it is more resilient. When the weight does not bounce as high, the material is less resilient.

TABLE 10 resilience measurement of some of the cured products.

| Cured sample | Resilience Number of units |
| --- | --- |
| Formulation 5 (Invention) | 14 |
| Formulation 7 (Invention) | 10 |
| Formulation 4 (Invention) | 10 |
| Formulation 6 (Invention) | 13 |
| Formulation 8 (comparative) | 61 |
| Formulation 9 (comparative) | 64 |

Table 10 shows that the comparative formulation have higher resilience and will translate vibration through the materials more readily whereas cured formulations according to the invention have lower resilience.

"Tan delta" is an abbreviated form of the terms "Tangent of Delta". The tan delta quantifies the way in which a material absorbs and disperses energy. It expresses the out-of-phase time relationship between an impact force and the resultant force that is transmitted to the supporting body. The tan delta is also known as the Loss Factor due to this loss of energy from the impact force via conversion to, and dispersal of, a safer form of energy. Thus, the tan delta is ultimately an indication of the effectiveness of a material's damping capabilities. The higher the tan delta, the greater the damping coefficient, the more efficient the material will be in effectively accomplishing energy absorption and dispersal. Tan delta is equal to the ratio of loss modulus over the storage modulus or tan (delta)=G"/G'.

G"=loss modulus and G'=storage modulus. Higher values correlate to a material that dampens more effectively than those with lower values.

Table 11 shows that the examples of the inventive materials dampen better than the comparative material.

TABLE 11 tan delta measurements of some of the cured products

| Cured sample | Tan Delta Number of units |
| --- | --- |
| Formulation 5 (Invention) | 18.2679 |
| Formulation 7 (Invention) | 17.7256 |
| Formulation 4 (Invention) | 24.1223 |
| Formulation 6 (Invention) | 22.9557 |
| Formulation 9 (comparative) | 12.6070 |
| Formulation 10 (comparative) | 8.7501 |

Tan delta measurements were made using an Anton Parr MCR 302 at 25° C. G" and G' were measured as the material cured. The tan delta was calculated from these two values. The cured sample of the silicone syntactic foams prepared from addition curing type organopolysiloxanes compositions according to a preferred embodiment of the invention could be advantageously used as damping material and fulfill the required targeted goal within electric vehicle field which is looking eagerly to a damping control strategy to minimize drivetrain oscillations.

Flame resistance of 3 cured material according to the invention were measured and are quoted in Table 12. All formulations tested were self-extinguishing.

TABLE 12

Flame resistance results of some cured material according to the invention.

| Cured Samples | Flame Burn Time After 10 s Burn seconds | Flame Burn Time After 2nd 10 s Burn seconds | Glow Time After 2nd 10 s Burn seconds |
| --- | --- | --- | --- |
| Formulation 7 (Invention) | 68.0 | 0.0 | 0.0 |
| Formulation 4 (Invention) | 46.0 | 0.0 | 0.0 |
| Formulation 6 (Invention) | 48.6 | 0.0 | 0.0 |

IV) Examples Part III

TABLE 13

Formulation 11 - Invention

| Part A | Percent by weight |
| --- | --- |
| Organopolysiloxane A1 | 84.1263% |
| Catalyst C | 0.0337% |
| Hollow glass beads D2 | 15.8400% |
| Total | 100.0000% |

| Part B | Percent by weight |
| --- | --- |
| Organopolysiloxane A1 | 65.551% |
| Organopolysiloxane B1 (CE) | 16.778% |
| Organopolysiloxane B2 (XL) | 1.830% |
| Cure rate controller G2 | 0.001% |
| Hollow glass beads D2 | 15.840% |
| Total | 100.000% |

Formulation 11 (invention) and a comparative formulation 12 (tin catalyzed condensation cured product) are prepared according to the ingredient described respectively in Tables 13 and 14.

TABLE 14

Formulation 12-Condensation Cured Comparative Formulation 12

| Condensation Cured Comparative Formulation 12 | Percent by weight |
|---|---|
| *Dimethylsilanol α,ω -endblocked polydimethylsiloxane with a viscosity of approximately 3500 mPa·s. | 70.16% |
| Hollow glass beads D2 | 15.84% |
| Hi Pro Green - Tin based cure catalyst with alkoxy silanes for curing silanol functional siloxane- Product is sold by Elkem Silicones USA Corporation in York South Carolina USA | 5.00% |
| Total | 91.00% |

Battery packs can have long distances that the insulating material (the liquid precursor, before crosslinking, of the silicone syntactic foam according to the invention) needs to travel from the outside air when filling the pack. The comparative formulation 12 described above needs moisture from the air to cure quickly. The formulation was mixed at 25° C. and allowed to rest at that temperature until it had cured enough for an initial durometer reading could be taken. The condensation curable comparative formulation 12 was also made and allowed to rest in the same fashion as the inventive formulation 11. Both samples were made and then allowed to rest after being poured into an aluminum dish that had material at 1 cm thickness and 5.2 cm in diameter. One 5.2 cm face of the material was exposed to the air and no air (or moisture from the air) could move through the bottom or sides of the aluminum dish. This configuration is representative of what might happen in a typical battery pack. Air with moisture could be present over one face of the potting material for a battery, while much of the material is below that surface relying on moisture to migrate through the bulk of the potting material.

Regarding inventive formulation 11 it took approximately 12 minutes to be able to measure the durometer of the material on a Shore A range. The durometer was approximately 15 Shore A. At one hour the durometer was 50 Shore A. Similar formulations reached approximately 52-54 Shore A in previous examples. When checking the condensation curable formulation 12, it took until 1 hour and 42 minutes before a durometer measurement could be made, and the value was 11.7 Shore A. When pressing on the sample by hand, and then pulling a second sample (equivalent in a dish) apart, it was found that the bottom half of the sample was still liquid. The test sample was only cured in a layer on the top. This indicates that the condensation cured material requires significantly longer time to cure in a representative test configuration than the inventive formulation. It would be advantageous if the material cures more quickly to speed up production times when potting battery packs.

Another cure system, a peroxide cure system was tested. However, peroxides typically require heat to cure so this is already a disadvantage. As shown above, the inventive formulation 11 can be made to cure very quickly if that is desired, and no heat or energy to heat is required.

As below a peroxide comparative formulation 13 is described in Table 15:

TABLE 15

Formulation 13 - Peroxide Cured Comparative Formulation 1:1 Mix Ratio by weight

| Part A | Percent by weight |
|---|---|
| Hollow glass beads D2 | 15.84% |
| Organopolysiloxane A2 | 84.16% |
| Total | 100.00% |

| Part B | Percent by weight |
|---|---|
| Hollow glass beads D2 | 15.84% |
| Organopolysiloxane A2 | 62.54% |
| Organopolysiloxane A3 | 21.02% |
| DBPH* | 0.61% |
| Total | 100.01% | weight
*DBPH=Varox®=consist of greater than 90% by weight of 2,5-dimethyl-2,5-di(t-butylperoxy) hexane and is sold by R. T. Vanderbilt
Organopolysiloxane A3: Poly(methylvinyl) (dimethyl) siloxane with dimethylvinylsilyl end-units with a viscosity at 25° C.=390 mPa·s;

Class and Grasso suggest curing silicones with a DBPH catalyst at 177° C. for one hour (reference: Class, J. B.; Grasso, R. P., The Efficiency of Peroxides for Curing Silicone Elastomers, Rubber Chemistry and Technology, September 1993, Vol. 66, No. 4, pp. 605-622). We followed this advice in curing our formulation as well. No post cure was done.

The same type of container was used to hold the material during cure (aluminum dish, one open face, 5.2 cm in diameter and 1 cm thickness of the poured material). We kept one face open, because when performing potting, it is common to pour into a container and cure the material open to the air. Placing a lid on the container to keep air out would be an extra cost for the lid and extra time to attach the lid in a production setting. When cured for one hour at 177° C., the sample was removed from the oven. The surface facing the air was not cured. This is not an unusual phenomenon, but was tested in these formulations to see if a similar formulation to the inventive formulation would have the issues seen in other peroxide cured silicone formulations. Once the uncured layer was removed, the cured peroxide comparative elastomer formulation 13 had a durometer of 20 Shore A.

Three ways to eliminate lack of cure at an oxygen containing interface are typically used in the industry:
  Removal of oxygen from the cure zone by use of inert gas, by use of waxes that migrate to the surface and form a barrier, or by use of films that are in direct contact with the coating.
  Increasing free radical concentration by increasing the peroxide level.
  Use chemicals that react with the peroxy radicals.

All of these solutions to lack of cure may work. However, heating would still be needed for the sample and implementation of the solutions would either require much more complicated formulations which change the cured elastomer (i.e. waxes, chemicals that react with the peroxy radicals, etc.) and more expensive formulations (i.e. more free radical peroxides).

The invention claimed is:
1. A silicone rubber syntactic foam comprising a silicone rubber binder and hollow glass beads, wherein said silicone rubber syntactic foam is obtained by curing an addition curing type organopolysiloxane composition X,
wherein the addition curing type organopolysiloxane composition X comprises:
(i) 100 parts by weight of an organopolysiloxane A having at least two alkenyl groups attached to silicon atoms in a molecule,
(ii) from more than 10 parts to 50 parts by weight of an organo-hydrogenpolysiloxane B having at least two, preferably at least three hydrogen atoms attached to silicon atoms in a molecule, and
(iii) a catalytic amount of an addition reaction catalyst C.

2. The silicone rubber syntactic foam of claim 1, wherein B comprises a mixture of two silicon compounds B one comprising two telechelic hydrogen atoms bonded to silicon per molecule with no pendent hydrogen atoms bonded to silicon per molecule and the other comprising at least three hydrogen atoms bonded to silicon per molecule.

3. The silicone rubber syntactic foam of claim 1, wherein the catalyst is an effective amount of hydrosilylation catalyst.

4. The silicone rubber syntactic foam of claim 1, wherein C is a platinum based hydrosilylation catalyst C.

5. The silicone rubber syntactic foam of claim 1, wherein the organopolysiloxane composition X further comprises at least one additives H selected from the group consisting of a pigment, a dye, clays, a surfactant, hydrogenated castor oil, wollastonite, aluminium trihydrate, magnesium hydroxide, halloysite, huntite hydromagnesite, expandable graphite, zinc borate, mica, afumed silica, or a combination thereof.

6. The silicone rubber syntactic foam of claim 1, wherein the organopolysiloxane composition X further comprises at least one cure rate controller G which slows the curing rate of the silicone composition.

7. The silicone rubber syntactic foam of claim 1, wherein the organopolysiloxane A is selected from the group of dimethylpolysiloxanes containing dimethylvinylsilyl end groups.

8. The silicone rubber syntactic foam of claim 1, wherein the viscosity at 25° C. of the organopolysiloxane A is between 5 mPa·s and 60,000 mPa·s.

9. The silicone rubber syntactic foam of claim 1, wherein the viscosity at 25° C. of the organopolysiloxane A is between 5 mPa·s and 5,000 mPa·s.

10. The silicone rubber syntactic foam of claim 1, wherein the viscosity at 25° C. of the organopolysiloxane A is 5 mPa·s and 350 mPa·s.

11. The silicone rubber syntactic foam of claim 4, wherein the viscosity at 25° C. of B comprises two telechelic hydrogen atoms bonded to silicon per molecule with no pendent hydrogen atoms bonded to silicon per molecule is between 5 and 100 mPa·s, and the viscosity at 25° C. of B comprising at least three hydrogen atoms bonded to silicon per molecule is between 5 and 2000 mPa·s.

12. The silicone rubber syntactic foam of claim 1, wherein the viscosities at 25° C. of the organopolysiloxane A and B comprising at least two hydrogen atoms bonded to silicon per molecule are chosen so that the viscosity at 25° C. of the addition curing type organopolysiloxane composition X is between 500 mPa·s and 300,000 mPa·s.

13. The silicone rubber syntactic foam of claim 1, wherein the addition curing type organopolysiloxane composition X has a viscosity is between 500 mPa·s to 5000 mPa·s.

14. The silicone rubber syntactic foam of claim 1, wherein the addition curing type organopolysiloxane composition X has a viscosity is between 500 mPa·s to 2500 mPa·s.

15. The silicone rubber syntactic foam of claim 1, wherein the hollow glass beads exhibit crush strengths ranging from 1.72 megapascal (250 psi) to 186.15 Megapascals (27,000 psi) at which ten percent by volume of the first plurality of hollow glass beads collapse.

16. The silicone rubber syntactic foam of claim 1, wherein the hollow glass beads are hollow borosilicate glass microspheres.

17. The silicone rubber syntactic foam of claim 1, wherein the hollow glass beads are hollow glass microspheres.

18. The silicone rubber syntactic foam of claim 1, wherein the level of hollow glass beads is between 5% and 70% by volume of the silicone rubber syntactic foam.

19. A secondary battery pack comprising
at least one battery module casing in which is disposed a plurality of battery cells which are electrically connected to one another,
the silicone rubber syntactic foam of claim 1, and said silicone rubber syntactic foam fills partially or fully open space of said battery module casing and/or covering partially or totally said battery cells and/or covering partially or totally said module casing, and
optionally a lid covering the battery module casing.

20. The secondary battery pack of claim 19, wherein the secondary battery pack further comprises a coolant inlet manifold, a coolant outlet manifold and a plurality of thermal exchange tubes as heat dissipation members and extending between the inlet and outlet manifolds, said thermal exchange tubes are disposed at one or more interfaces between the battery cells and have a coolant passing through to exchange heat generated from the battery cells during the charge and discharge of the battery cells.

21. The secondary battery pack of claim 19, wherein it is located within a vehicle.

22. The secondary battery pack of claim 19, wherein it is located in an automotive motor vehicle.

23. The secondary battery pack of claim 19, wherein it is located in an all-electric vehicle (EV), a plug-in hybrid vehicle (PHEV), or a hybrid vehicle (HEV).

24. The secondary battery pack of claim 19, wherein it is located in an aircraft, a boat, a ship, a train, or wall unit.

25. A process for preparation of a secondary battery pack comprising:
(a) preparing at least one battery module casing in which is disposed a plurality of battery cells which are electrically connected to one another,
(b) introducing into the said battery module casing the silicone rubber syntactic foam of claim 1,
(c) filling completely or partially said battery module casing, and
(d) curing the silicone rubber syntactic foam, and optionally
(e) covering the battery module casing with a lid.

26. The silicone rubber syntactic foam of claim 1, wherein the addition curing type organopolysiloxane composition X comprises 12 to 50 parts by weight of an organo-hydrogenpolysiloxane B having at least two, preferably at least three hydrogen atoms attached to silicon atoms in a molecule.

* * * * *